United States Patent [19]
Wada et al.

[11] Patent Number: 4,780,806
[45] Date of Patent: Oct. 25, 1988

[54] CONTROL DEVICE FOR AN APPARATUS

[75] Inventors: Kanji Wada; Keiji Nakatani, both of Toyokawa, Japan

[73] Assignee: Minolta Camera Kabushiki Kaisha, Osaka, Japan

[21] Appl. No.: 780,612

[22] Filed: Sep. 26, 1985

[30] Foreign Application Priority Data

| Sep. 26, 1984 | [JP] | Japan | 59-202638 |
| Sep. 26, 1984 | [JP] | Japan | 59-202639 |
| Sep. 26, 1984 | [JP] | Japan | 59-202640 |

[51] Int. Cl.⁴ .............................. G06F 15/20
[52] U.S. Cl. .................... 364/146; 235/382; 355/6; 355/14 CU
[58] Field of Search ............... 364/140–147, 364/514, 518, 401, 406; 355/14 R, 14 C, 14 CU; 235/375, 380, 381, 382, 382.5, 487; 340/825.3, 825.31, 825.32, 825.33, 825.34, 825.35; 380/23–25

[56] References Cited

U.S. PATENT DOCUMENTS

| 3,866,173 | 2/1975 | Moorman et al. | 235/382 |
| 3,997,873 | 12/1976 | Thornton | 355/6 |
| 4,211,919 | 7/1980 | Ugon | 235/487 |
| 4,298,793 | 11/1981 | Melis et al. | 235/487 |
| 4,341,951 | 2/1982 | Benton | 235/379 |
| 4,375,032 | 2/1983 | Uchida | 235/382 X |
| 4,453,074 | 6/1984 | Weinstein | 235/382 X |
| 4,482,802 | 11/1984 | Aizawa et al. | 235/382 X |
| 4,497,037 | 1/1985 | Kato et al. | 355/14 C X |
| 4,501,485 | 2/1985 | Tskudaka | 355/14 CU X |
| 4,523,087 | 6/1985 | Benton | 235/380 X |
| 4,529,870 | 7/1985 | Chaum | 235/379 |
| 4,531,826 | 7/1985 | Stoughton et al. | 355/14 CU |
| 4,578,567 | 3/1986 | Granzow et al. | 235/382 X |
| 4,594,663 | 6/1986 | Nagata et al. | 235/382.5 X |

Primary Examiner—Joseph Ruggiero
Attorney, Agent, or Firm—Price, Gess & Ubell

[57] ABSTRACT

A control device for use in controlling various information relating to an apparatus which can be operated in response to the instructions fed from the control device. The control device is provided with a memory device for storing information relating to the operation of the apparatus and is operable by mounting a memory medium in which coded information in relation to the user of the apparatus are registered. The control device comprises a key input board operable by the user for inputting a specific coded signal, apparatus for causing the input coded signal to be registered in the memory medium and apparatus for enabling the apparatus in response to the registration of the coded signal in the memory medium.

12 Claims, 24 Drawing Sheets (A)

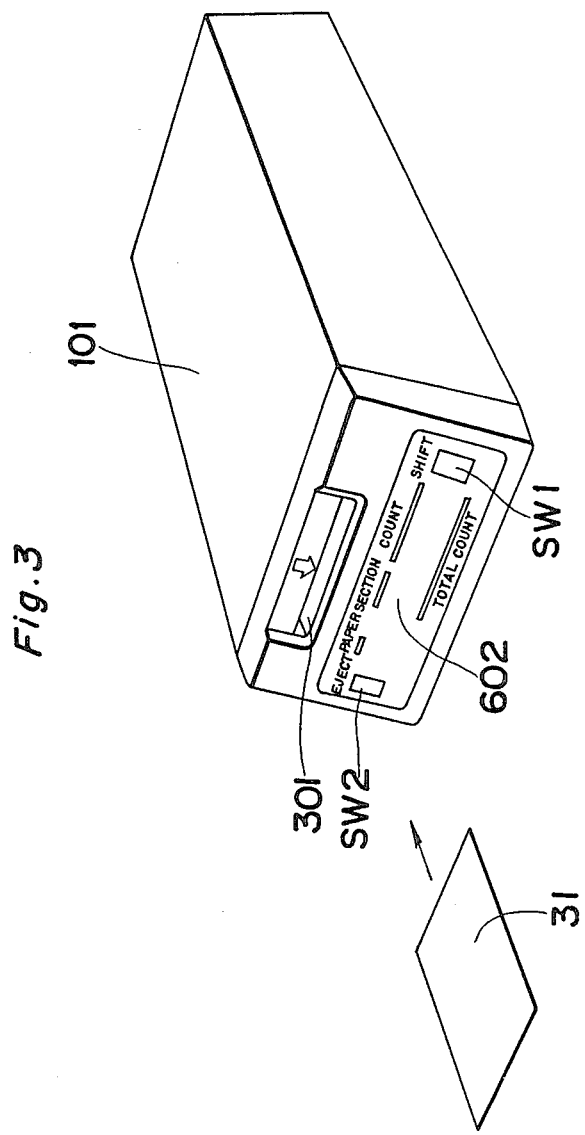

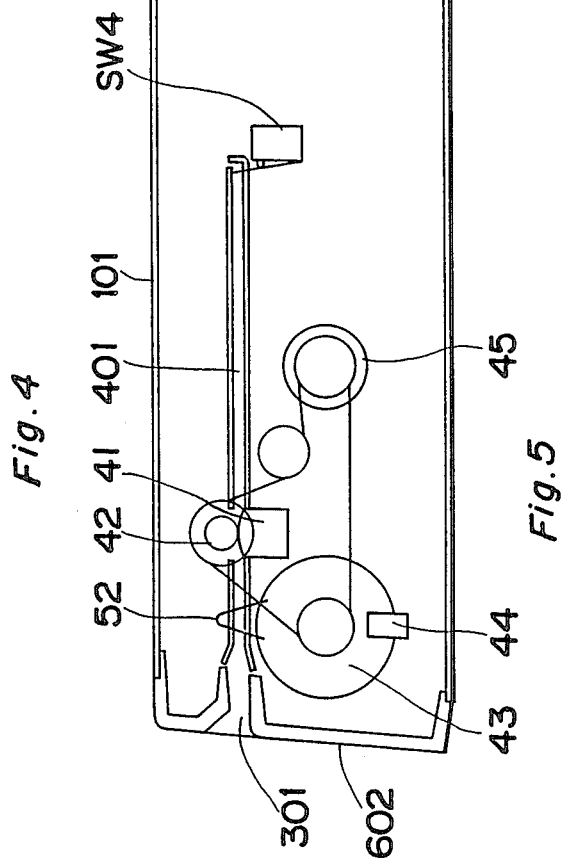
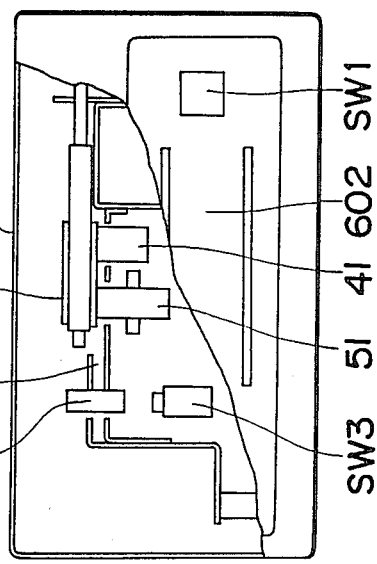

CONTROL DEVICE FOR AN APPARATUS

FIELD OF THE INVENTION

The present invention relates to a control device for controlling the various information used in an apparatus such as a copying machine.

BACKGROUND OF THE INVENTION

A control device for controlling the information input into a copying machine is disclosed in Japanese Patent Publication No. 27840/1982, wherein setting a department card in which a predetermined code number assigned to the department is written enables the copying machine and the number of copies to be stored in the control apparatus. In the control apparatus mentioned above, there is provided an arrangement for preventing false use of the department card, in case the card is lost. In one example, the arrangement operates to register the number of the lost department card in a memory region (referred to as a disabling memory region hereinafter) for inhibiting the use of the copying machine or warning when the lost department case is set falsely in the copying machine.

The above arrangement has a disadvantage in that if the department card is falsely used in a different copying machine in which the number of the department card is not registered in the disabling memory region, the copying machine is activated allowing a false copy.

Such department card is usually delivered for use by a card maker with the department number or identification number written in the card, so that is has been impossible to re-write the department number even by the copying machine maker. Accordingly, when the card is broken or lost, the user or maker of the copying machine must have the card maker produce another fresh card. Therefore, if the department card is lost or broken, the copying machine can not be used until a fresh card is provided.

Furthermore, conventionally, the department cards of the above kind are released after writing a predetermined copying cost, an upper limit of available number of copy and so on on the card make side. However the upper limit of the copying cost and the available number of copies are different user by user, depending on the manner of use. Apparently, it is a complicated work to write various kinds of upper limits of the copying cost and available number of copy. In the prior art, however, such a disadvantage has not been improved upon.

SUMMARY OF THE INVENTION

An essential object of the present invention is to provide a control device for an apparatus being operable by mounting an identification card, wherein false use of the identification card can be prevented.

Another object of the present invention is to provide a control device of an apparatus being operable by mounting an identification card, wherein the apparatus can be used even if the identification card is lost with the information of use of the apparatus being registered in the apparatus in every department.

A further object of the present invention is to provide a control device of an apparatus being operable by mounting an identification card, wherein an upper limit of the rental fee of the apparatus can be optionally set by the user side and the set rental fee can be registered in the apparatus automatically.

The present invention is characterized in that the control device is employed for controlling a copying machine, wherein said control device serves to store the number of copies made in the copying machine in response to the content of a memory device and the content of the memory device can be rewritten.

Furthermore, the present invention is characterized in that the control device comprises input means for inputting an upper limit value relating to the use of the apparatus and means for writing the inputted upper limit value in the memory device.

BRIEF DESCRIPTION OF THE DRAWINGS

FIG. 3 is a perspective view showing an embodiment of a control device according to the present invention, FIG. 4 is a side view showing an essential portion of the inside of the control device shown in FIG. 3, FIG. 5 is a front view of the control device shown in FIG. 3 with a part of the front panel broken.

DETAILED DESCRIPTION OF PREFERRED EMBODIMENTS

Figure 1:
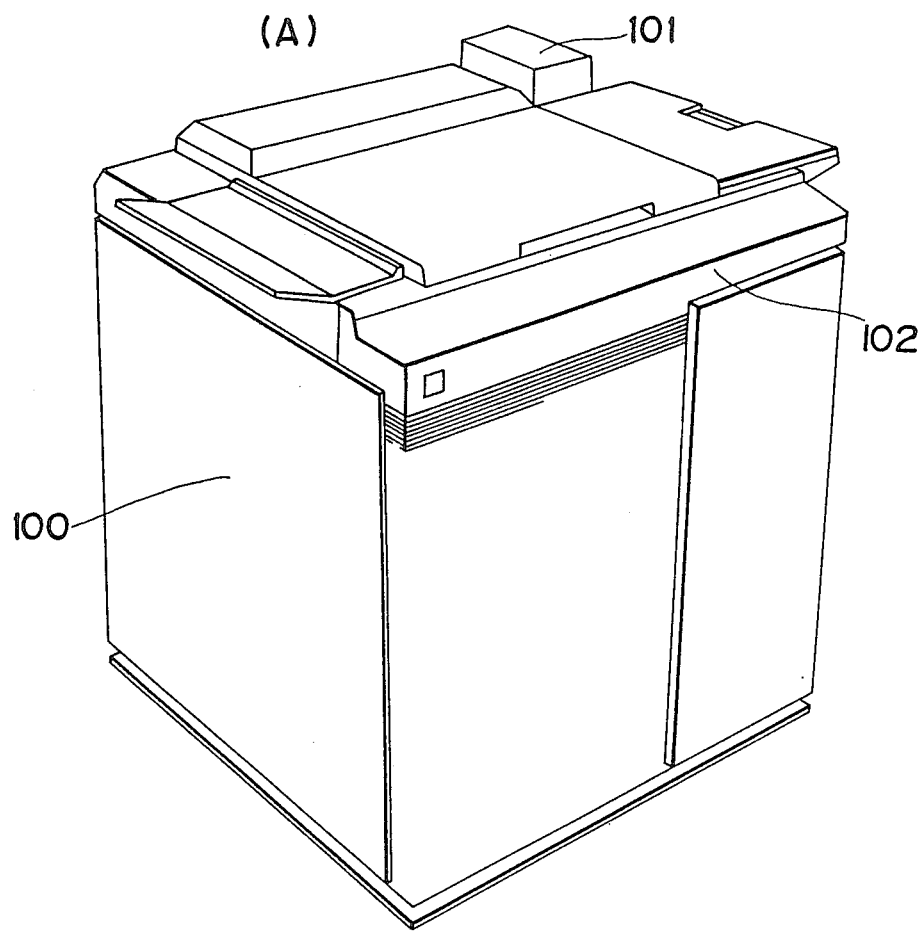
FIG. 1A is a perspective view of a copying machine.
FIG. 1B is a top plan view of an operation panel used in the copying machine shown in FIG. 1A.
Figure 1:
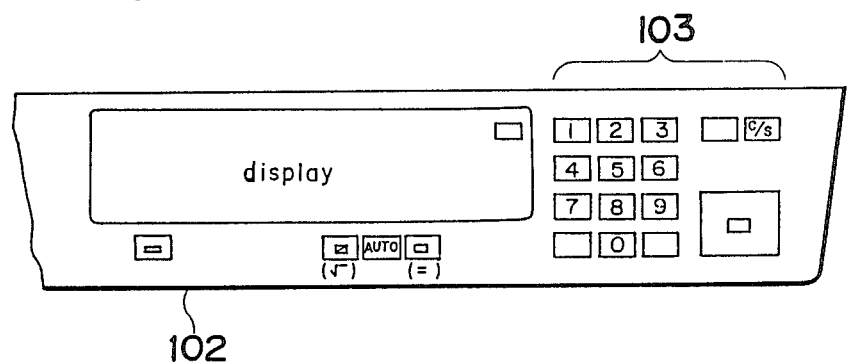

Before the description proceeds, it is noted that throughout the embodiments shown in the attached drawings the like parts are designated by like reference numerals and the description of the details of the like parts are omitted.

Referring to FIGS. 1A and 1B, an electrophotographic copying machine 100 is provided with a control device 101, which is mounted on the top of the copying machine 100 and is electrically connected with the copying machine 100 for controlling the operation thereof when a magnetic card is inserted in the control device 101. The control device 101 is related to operation keys 103 disposed on the operation panel 102 of the copying machine.

Figure 2:
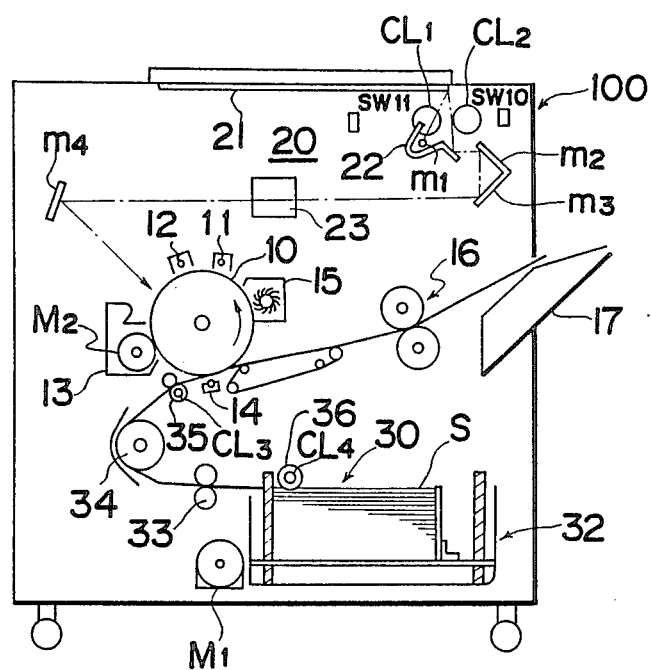
FIG. 2 is a side view showing inside of the copying machine shown in FIG. 1A.

The arrangement of the copying machine 100 is explained with reference to FIG. 2, in which A photoreceptor drum 10 is disposed in the central portion of the copying machine and an eraser lamp 11, a corona charger 12, developing device 13, a transfer charger 14 and a cleaning device 15 are disposed around the photosensitive drum 10 in a known manner. An original to be copied can be placed on an original platform 21 made of glass, then the original can be scanned by an optical system 20 containing an illuminating lamp 22, reflection mirrors m 1 through m 4 and a lens 23. The image of the original obtained by the scanning is projected onto the surface of the photoreceptor drum 10.

Since the construction and operation of the optical system is well known, the details thereof are herein omitted.

A paper feeding device 30 is composed of paper feeding rollers 36 and a paper holder 32 for holding the stacked papers S and the feeding rollers 36 are rotated synchronized with the copying operation so that each paper present on the top of the stacked papers in the paper holder 32 can be sequentially transported toward the photoreceptor drum 10 through transport rollers 33, 34 and timing rollers 35 and so on.

In the arrangement described above, the photoreceptor drum 10 is rotated in response to a start of the copying operation and the picture image of the original is formed on the surface of the photoreceptor drum 10 by the operation of the corona charging, exposure and development and the image is transferred on the copy paper which is transported in synchronism with the copying operation by the operation of the transfer charger 14.

The copy paper on which the image is already transferred is separated from the surface of the photoreceptor drum 10 and the copy paper is passed to the fixing device 16 for fixing the copied image, then discharged in the discharging tray 17. After the transfer of the image, the residual toner and electric charge remaining on the photoreceptor drum 10 are cleaned off by the cleaning device 15 and the eraser lamp 11 for preparing the subsequent copy.

A main motor M 1 drives the photoreceptor drum 10, the optical system 20 and the paper transportation device. M 2 is a developing motor, CL 1 and CL 2 are respectively clutches for operating the optical system in the scanning direction and retracting direction, CL 3 is a timing roller clutch and CL 4 is a paper feeding clutch.

The construction and operation of the control device 101 of the copying machine will be described below.

Referring to FIG. 3, the control device 101 comprises a card receptor 301, display unit 602, operation keys SW1 and SW2, card reader and writer 601 and CPU (central processing unit) 600, Referring to FIG. 4, there are disposed inside the control device 101 an encode 43 having a pulse generation disc for generation of a signal representing a write in timing of the data, pulse detecting sensor 44, an upper card transport roller 42, a magnetic head 41 for write and read, a guide 401 for transporting the card, a card transporting motor 45 and a card end detecting switch SW4 from the left to right in the drawing.

Referring to FIG. 5, an actuator 52 for detecting the leading edge of the card, a switch SW3 for detecting the leading edge of the card and a lower card transport roller 51 are disposed in the control device 101.

In the control device 101, a magnetic card 31 is inserted into the card receptor 301. The magnetic card may be an identification card, department card, personal card, totalling card, erasing card and serviceman card.

Upon operation of the switch SW3 for detection of the leading edge of the card due to insertion of the card, the card transporting motor 45 is rotated (in the clock wise direction in FIG. 4) so as to transport the card inside the control device 101 along the guide 401 through the upper transport roller 42 and the lower transport roller 51, to clamp the card therebetween.

The data registered in the card is read by the head 41 and the data is transferred to the CPU 600. When the leading edge of the card makes the card leading edge detecting switch SW4 ON, the card transporting motor 45 is stopped and the CPU 600 processes the data applied thereto.

The processing of the data continues to enable the copying of the copying machine, to register the number of copying in every department and every size of the paper, to store any trouble information such as paper jam in time by time or position by position manner and to display the data thus processed on the display unit.

Subsequently, upon operation of the key switch SW2, the display on the display unit is deleted and copy is inhibited, and in turn the card transporting motor 45 is reversed for discharging the card 31 to the card receptor 301 unless there is no need of updating the data in the card, thus the operation is ended. In case the data must be registered in the card, the output of the encoder 43 is fed to the CPU 600 through the sensor 44, the necessary data is written into the card by means of the magnetic head 41 in syncronism with the motion of the card during discharge. When the write in of the data is completed, the card transporting motor 45 is stopped and the card transporting motor 45 is driven in the forth direction to pass the card 31 again past the magnetic head 41 and the data read by the magnetic head is fed to CPU 600 for confirmation of data written in or updated in the card 31.

When the leading edge of the card makes the card leading edge detecting switch SW4 ON, CPU 600 processes the data registered in the card 31 and data read in CPU 600 after registration of the data in the card 31 so that with the coincidence between them, the data is dealt with as the correct data and the card transporting motor 45 is reversed to discharge the card 31, finishing the operation. In case the data does not coincide, the registration of the data in the card 31 and read out of the data to CPU 600 are repeated until the coincidence occurs. The format of the data written in the card may be JIS B 9561 or another specific format may be used.

Figure 6:
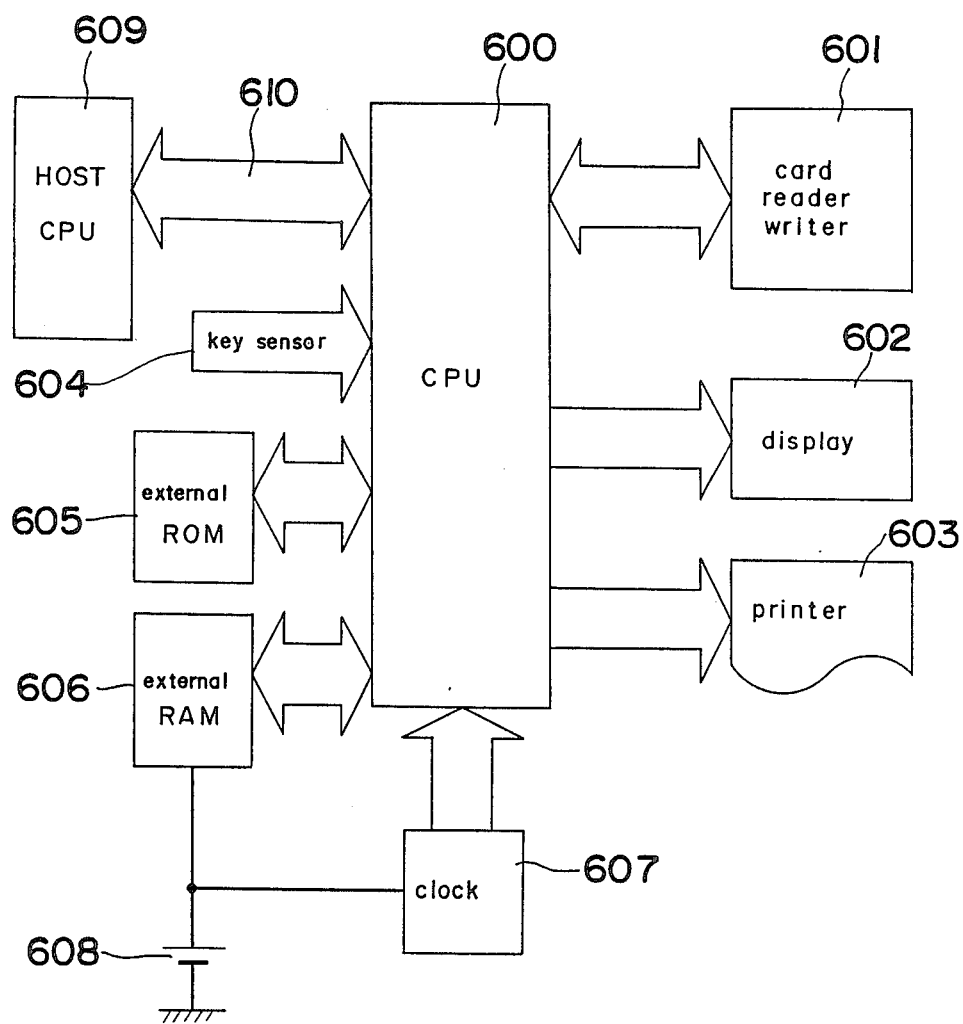
FIG. 6 is a block diagram of the control device according to the present invention.
Figure 7:
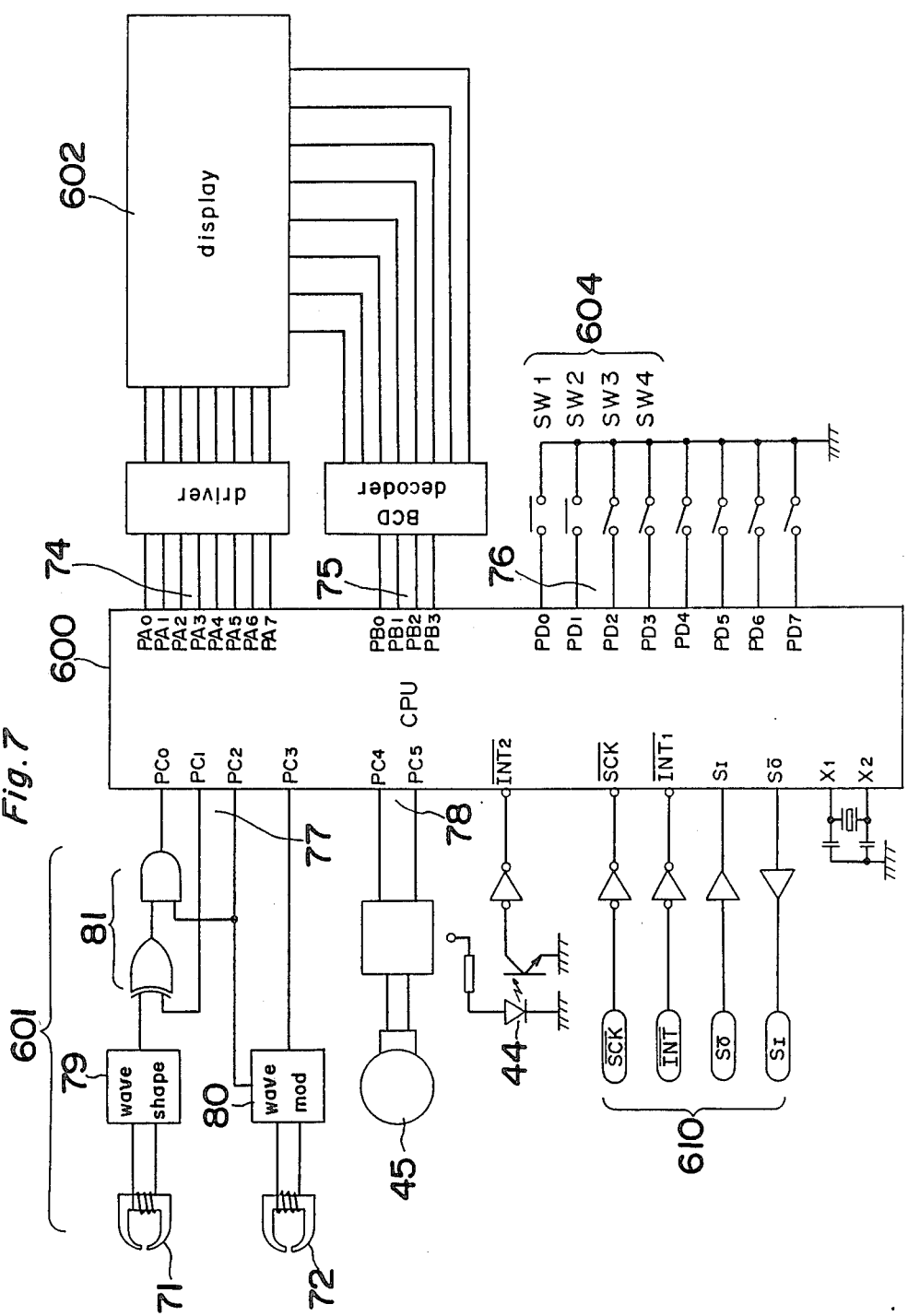
FIG. 7 is a detailed block diagram of the control device shown in FIG. 6, FIGS. 8, 9(a), 9(b), 10(a), 10(b) and 11 through 14 are flow charts showing operation of the copying machine shown in FIG. 1A and the control device shown in FIG. 3.

Referring to FIGS. 6 and 7 showing the block diagram of the circuit arrangement of the control device 101 and the detail thereof, CPU 600 is coupled with the read and write unit 601 for the magnetic card 31, display unit 602, a printer 603, various operation keys 604, an external program ROM 605, an external RAM 606 and a clock 607 through the input and output ports 74 to 78.

The external RAM 606 and clock 607 are backed up with a battery 608 for protecting the data stored therein in case of failure of the power.

The read and write unit 601 is provided with a read head 71, a wave demodulator and wave shape modulator 79, an input gate 81, writing head 72 and a wave modulator 80.

Although the embodiment is so arranged that the magnetic heads 41 are provided with the read head 71 and the write head 72 separately, a single gap head which can be used commonly for reading and writing can be used.

CPU 600 of the control device 101 is coupled with CPU 609 of the copying machine 100 through the communication line 610 for the data communication.

The terminals of CPU 600 for the data communication include a serial data output terminal So for the serial transfer of the data, serial data input terminal Si for reception of the data, data sampling clock terminal sck and interrupt terminal as shown in the table 1.

For the data transfer, a conventional kind of format of data transfer may be used. One example of the data transfer format is disclosed in the Japanese Patent Publication No. 127,133/1984.

An example of the data format transferred to CPU 600 of the control device 101 from CPU 609 of the copying machine 100 is shown in the table 2 and table 3 and the example of the data format transferred to CPU 609 of the copying machine 100 from CPU 600 of the control device 101 is shown in the table 4 and table 5.

It is assumed that the content of the information transferred is coded as shown in the table 3 (1) to (4).

The state signal is shown in the table 6.

The control operation of the copying machine is described hereinafter.

Figure 8:
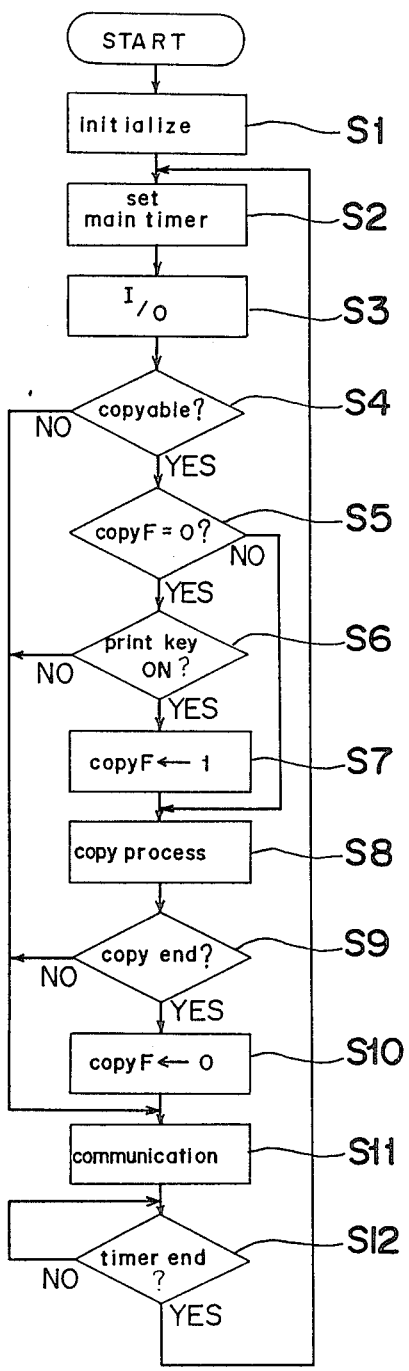

In the step S 1 shown in FIG. 8, various flags including a copy flag are reset and the number of copies, paper size and copy magnification are initialized.

In the step S 2, the main timer is set for defining the time length of one routine in CPU 609. In the step S 3, input processes of the operation keys including the key 103 and various switches are performed. Also the output processes for the motors, solenoids and display unit are performed.

In the step S 4, it is judged that the copy state signal sent from CPU 600 of the control device 101 is 1 or 0. The copy state signal is 1 when the copy is inhibited and is 0 when the copy is allowed. With 1 of the copy state signal that is the copy is inhibited, the step goes to S 11. When the copy is allowed, it is judged whether or not the copy flag F is 1. The copy flag F is made 1 when the copying machine is busy and made 0 when the copy is ready. When the copy flag is 1, the step goes to S 8. With 0 of the copy flag F, it is judged in the step S 6 whether or not the print key of the keys 103 is depressed. With NO, the step goes to S 11 and With YES, the copy flag F is set in the step S 7 and the step goes to S 8., therein various copying processes are performed. In the step S 9, whether or not the copy is completed is judged. When the copy is completed, the copy flag F is reset in the step S 10 and the step goes to S 11. When the copy has not been completed, the step goes to S 11 directly.

The data communication is performed in the step S 11.

It is judged in the step S 12 whether or not the main timer is completed. With YES, the program flow goes to the step S 2 and with NO, the step S 2 is repeated so as to adjust the time length of the one routine.

The operation of the control device 101 is explained hereinafter with reference to FIGS. 9 to 14.

Figure 9A:
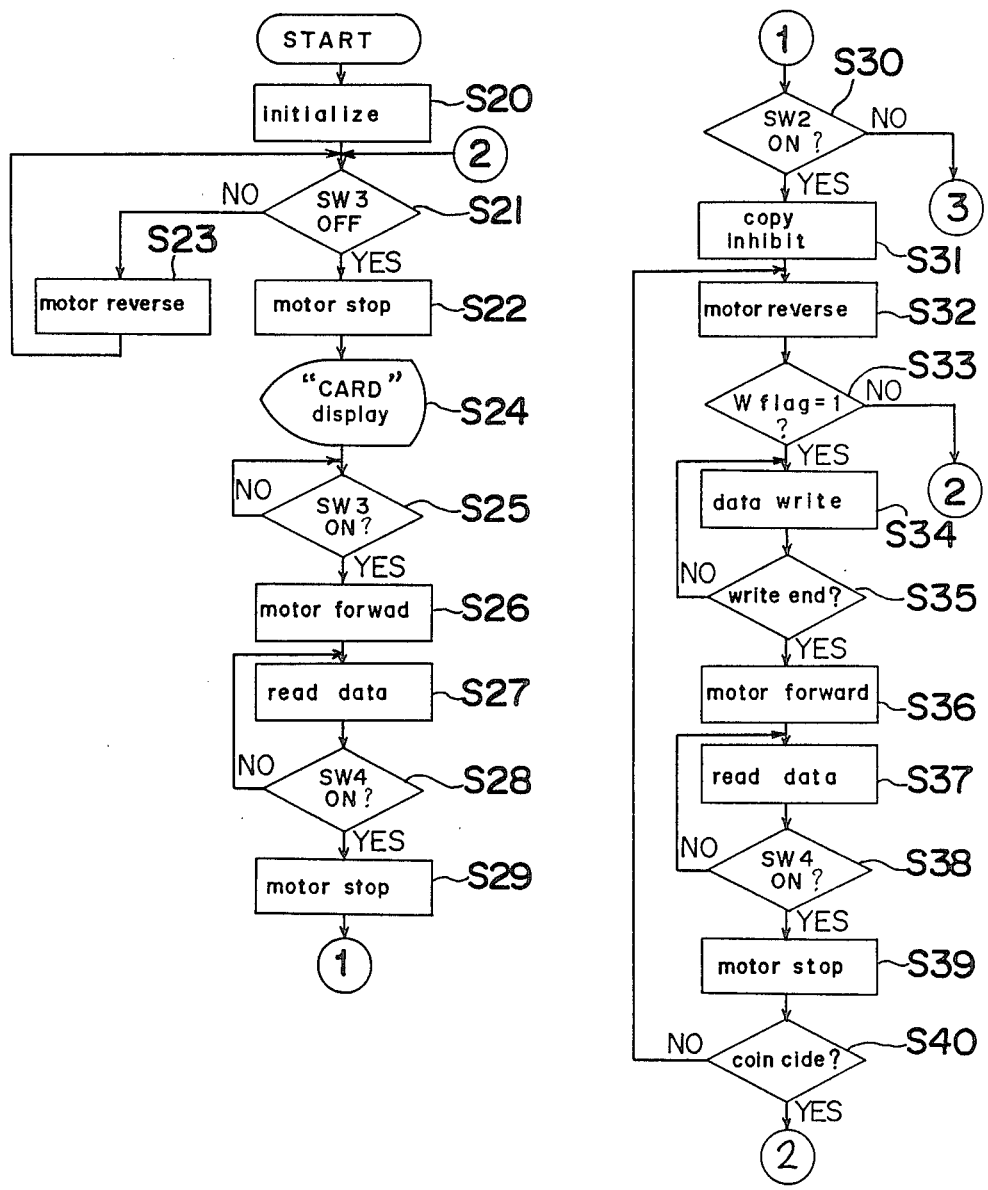
Figure 9B:
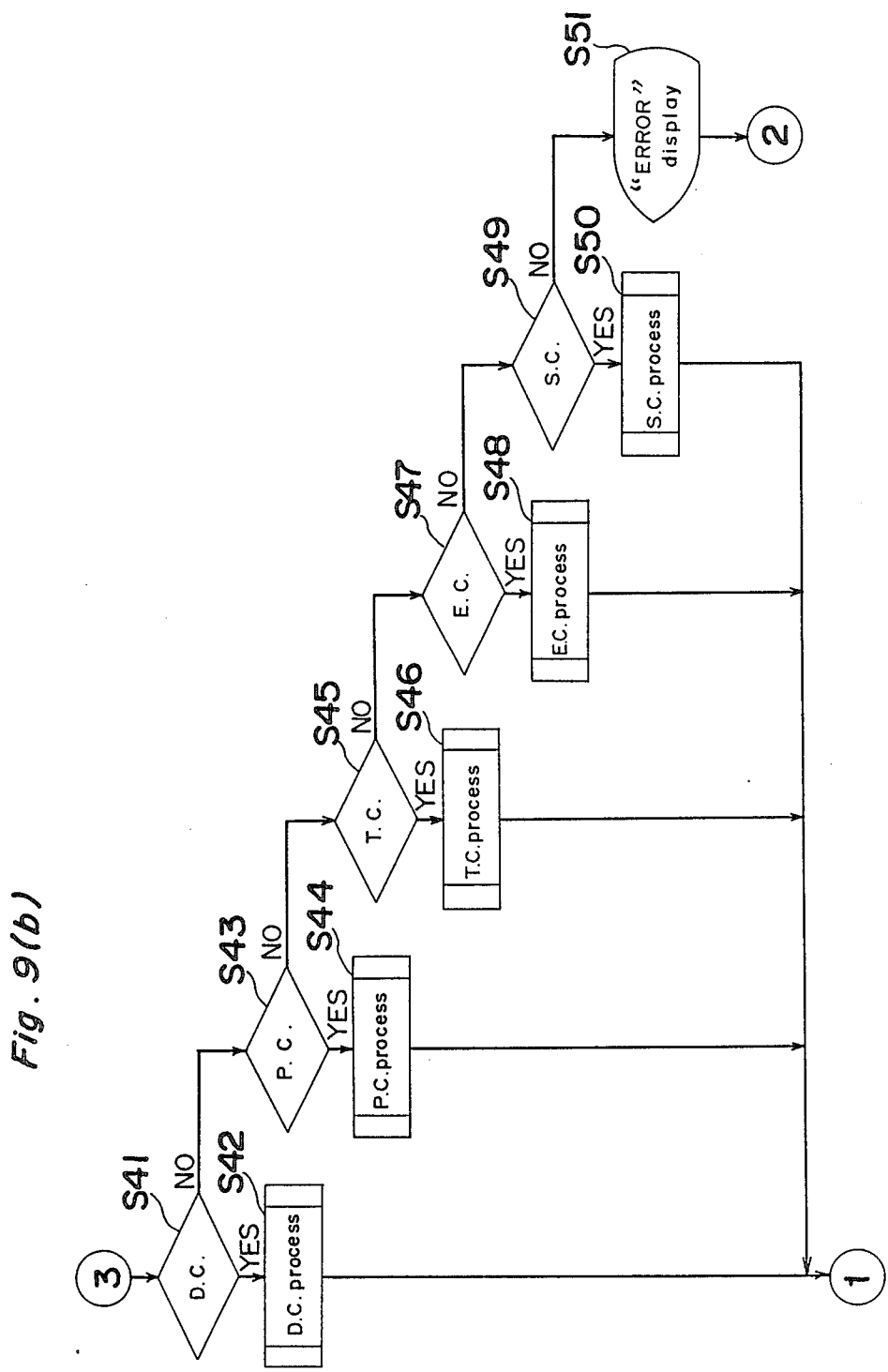

When the power is supplied to the copying machine 100, the control device 101 is initialized in the step S 20 as shown in FIG. 9(a). It is judged in the step S 21 whether or not the card 31 is set in the card receptor slot 301 by the signal of the first card leading edge detecting switch SW3. In case the magnetic card has been already set in the card receptor slot 301 at the time of application of the power, the card transporting motor 45 is reversedly rotated in the step S 23. In case the magnetic card 31 is absent in the card receptor slot 301 or removed therefrom, the card transporting motor 45 is stopped at the step S 22. In the step S 24, a name CARD is displayed on the display unit 602, subsequently it is determined in the step S 25 whether or not the card leading edge detecting switch SW3 is made ON that is the magnetic card 31 is set in the card receptor slot 301. In case the magnetic card 31 is set in the card receptor slot 301, the step goes to S 26 and in case the magnetic card 31 is not set in the card receptor slot 301, the step goes to S 25, repeating S 25.

In the step S 26 the card transporting motor 45 is rotated in the forward direction to transport the magnetic card 31 inside the control device 101 along the guide 401. The data registered in the magnetic card 31 is read by the magnetic head 41 and the data thus read is inputted to CPU 600 in the step S 27. It is determined in the step S 28 whether or not the card leading edge detecting switch SW4 that is it is determined whether the magnetic card 31 is completely entered in the control device 101. In case the magnetic card 31 is completely entered, the card transporting motor 45 is stopped in the step S 29. During the process of taking the magnetic card 31 in the control device 101, the step S 27 is repeated.

In the step S 30, it is determined whether or not the card discharge switch SW2 is depressed. In case the card discharge switch SW2 is depressed, the copy state signal (see the table 5 (2)) is made into inhibiting state in the step S 31, subsequently the card transporting motor 45 is reversed.

It is determined in the step S 33 whether the write-in flag is 1. The write-in flag is set 1 when it is necessary to write the data in the magnetic card 31, otherwise the write-in flag is reset to 0.

In case the write-in flag is 0, the step goes to S 21 to discharge the magnetic card 31. With 1 of the write-in flag, data is written in the magnetic card 31 in the step S 34. The write-in process is performed by interruption of the current applied to the write magnetic head 72 from the modulation unit 30 corresponding to the data to be written-in, synchronized with the write-in timing pulses inputted to CPU 600. The write-in timing pulses are produced by the output of the encoder 43 which is rotated synchronized with the card transportation and the sensor 44.

In the step S 35, it is determined that the write-in process is completed for judging that the necessary data is written in the magnetic card 31. In case the write-in process is completed, the step goes to S 36, otherwise, the steps S 34 and S 35 are repeated.

In the step S 36, the card transporting motor 45 is rotated in the forward direction and the data written in the magnetic card 31 in the previous S 34 is taken into the CPU again. It is determined in the step S 38 whether or not the card leading edge detecting switch SW4 is made ON. With NO, the steps S 37 and S 38 are repeated. With YES, the card transporting motor 45 is stopped and the step goes to S 40 wherein it is determined whether or not the data written in magnetic card 31 in the step S 34 and the data taken in CPU 600 in the step S 37 is coincided. In case both of the data are not equal, the program flow returns to the step S 32 to re-write the data in the magnetic card 31. In case both of the data are equal, the step goes to S 21 to discharge the magnetic card 31, the process is completed.

In the step S 30, if the card discharge switch SW2 is not depressed, the program flow goes to the step S 41, wherein it is determined that the magnetic card 31 entered in the control device 101 is the department card (referred to as D.C. in the flow charts). With YES, the process of the step S 42 is performed and returns to the step S 30. With NO in the step S 41, it is determined in the step S 43 that the magnetic card 31 entered in the control device 101 is a personal card (referred to as P.C. in the flow charts). With YES in the step S 43, the process of the step S 44 is performed and the program flow returns to the step S 30. With NO in the step S 43, the step goes to S 45.

A similar process shown in the steps S 45 to S 50 are made for the totalling card (referred to as T.C. in the flow charts), erasing card (referred to as E.C. in the flow charts) and the serviceman card (referred to as S.C. in the flow charts).

In case it is determined in the step S 49 that the magnetic card 31 is not the serviceman card, the control device determines that the entered magnetic card 31 is not suitable for the control device and displays "ERROR" in the display unit 602 in the step S 51 and the program flow returns to the step S 21 to discharge the false magnetic card 31.

The detailed operation in the steps S 42, S 44, S 46, S 48 and S 50 are shown in FIGS. 10 to 14.

Figure 10A:
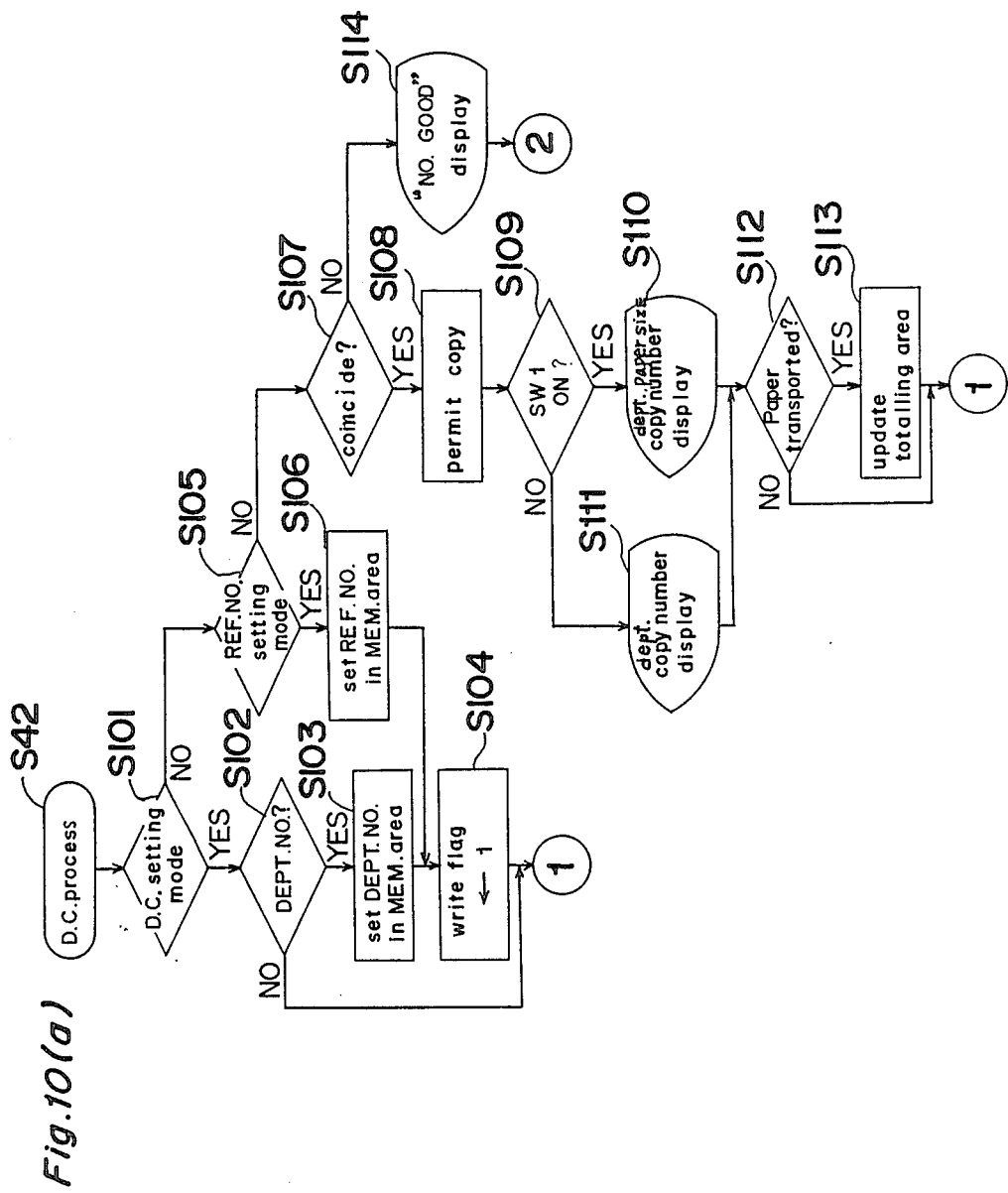
Figure 15:
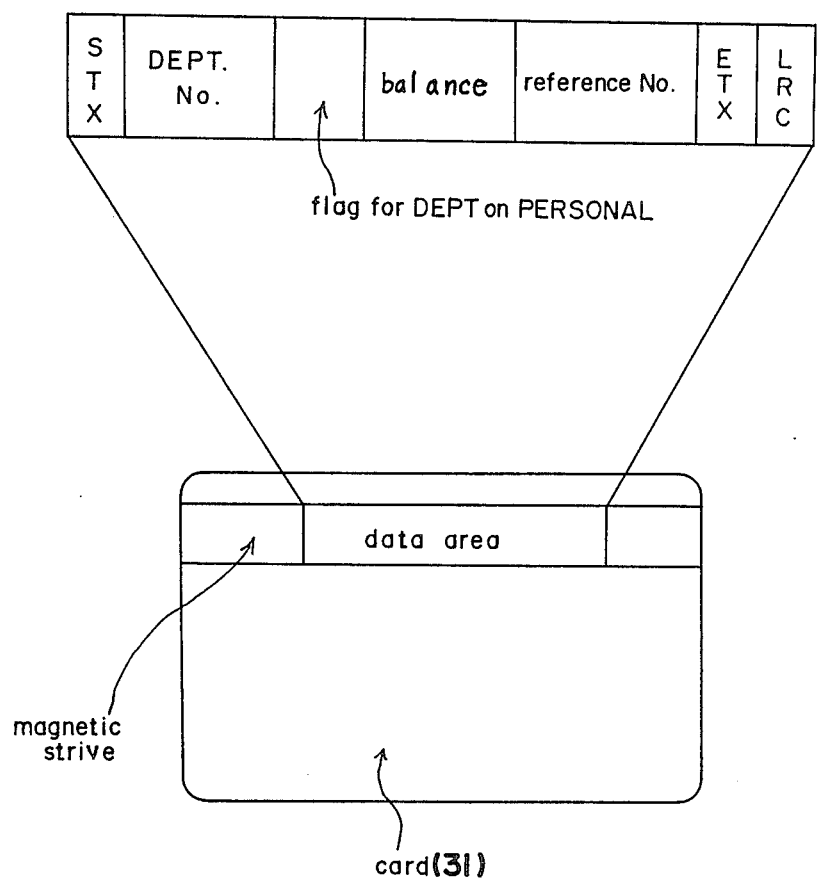
FIG. 15 is a top plan view of an department card used in the control device according to the present invention.

In FIG. 10(a), it is determined in the step S 101 whether or not the department number setting mode has been set. In case of YES, the step goes to S 102 and in case of NO, the step goes to S 105. The department number setting mode is the mode for registering the number assigned to the department in a given magnetic card 31. The determination in the step S 101 for determining whether or not the mode is the department number setting mode can be made by detecting that the data registered in a predetermined memory area of the magnetic card 31 is a specific data such as "00" or a predetermined flag is set in the magnetic card 31. An example of the format of the data registered in the magnetic card 31 is shown in FIG. 15.

In the step S 102, it is determined that the department number is inputted by the operation of the keys on the operation panel 102 of the copying machine 100. In case the department number is inputted, the inputted department number is set in the write-in area in the step S 103. The write-in flag is set as 1 in the step S 104 and the program flow returns to S 30. In case the department number is not inputted, the program flow returns to the step S 30 directly.

In case it is determined in the step S 101 that the mode is not the department number setting mode, i.e., the magnetic card 31 entered is already written in the department number, the step goes to S 105 to determine whether the reference number setting mode is set.

The reference number is the number for judging whether or not the magnetic card 31 entered in the control device 101 is available for the copying machine.

When the reference number written in the magnetic card 31 coincides with the number stored in the memory area of the RAM 606 which is backed up by the battery 608, it is determined that the magnetic card 31 entered in the control device is available.

The reference number setting mode is also a mode to write the reference number in the magnetic card 31.

In case of the reference setting mode, the reference number stored in RAM is transferred to the data write in area in the step S 106, and the write-in flag is set to 1 in the step S 104 and the program flow returns to the step S 30.

In case the present mode is not the reference number setting mode, i.e., the reference number is already written in the magnetic card 31, the step goes to S 107 to compare the reference number of the magnetic card 31 and the reference number stored in the RAM 606. In case both reference numbers do not coincided, the display unit 302 displays "NO GOOD" in the step S 114 to warn the operator that the magnetic card 31 entered is not available and the step goes to S 21 to discharge the false magnetic card 31. In case both data coincide, the copying machine is enabled in the step S 108 and it is judged in the step S 109 whether or not the operation key SW1 is made ON. With ON, the display unit 302 displays the department number, paper size and copy number for every department and every paper size in the step S 110. With OFF of the key switch SW1, the display unit 302 displays the department number and the total copy number for every department in the step S 111 and the step goes to S 112. In the step S 112, it is judged that the copying machine 100 is set to copy and the paper is transported. In case the paper is transported, the content of the memory area in which the total copy number for every department number is stored is updated by the new result in accordance with the department number and the copied paper size in the step S 113 and the step goes to S 30. If the paper is not transported, the step goes to S 30 directly.

Figure 10B:
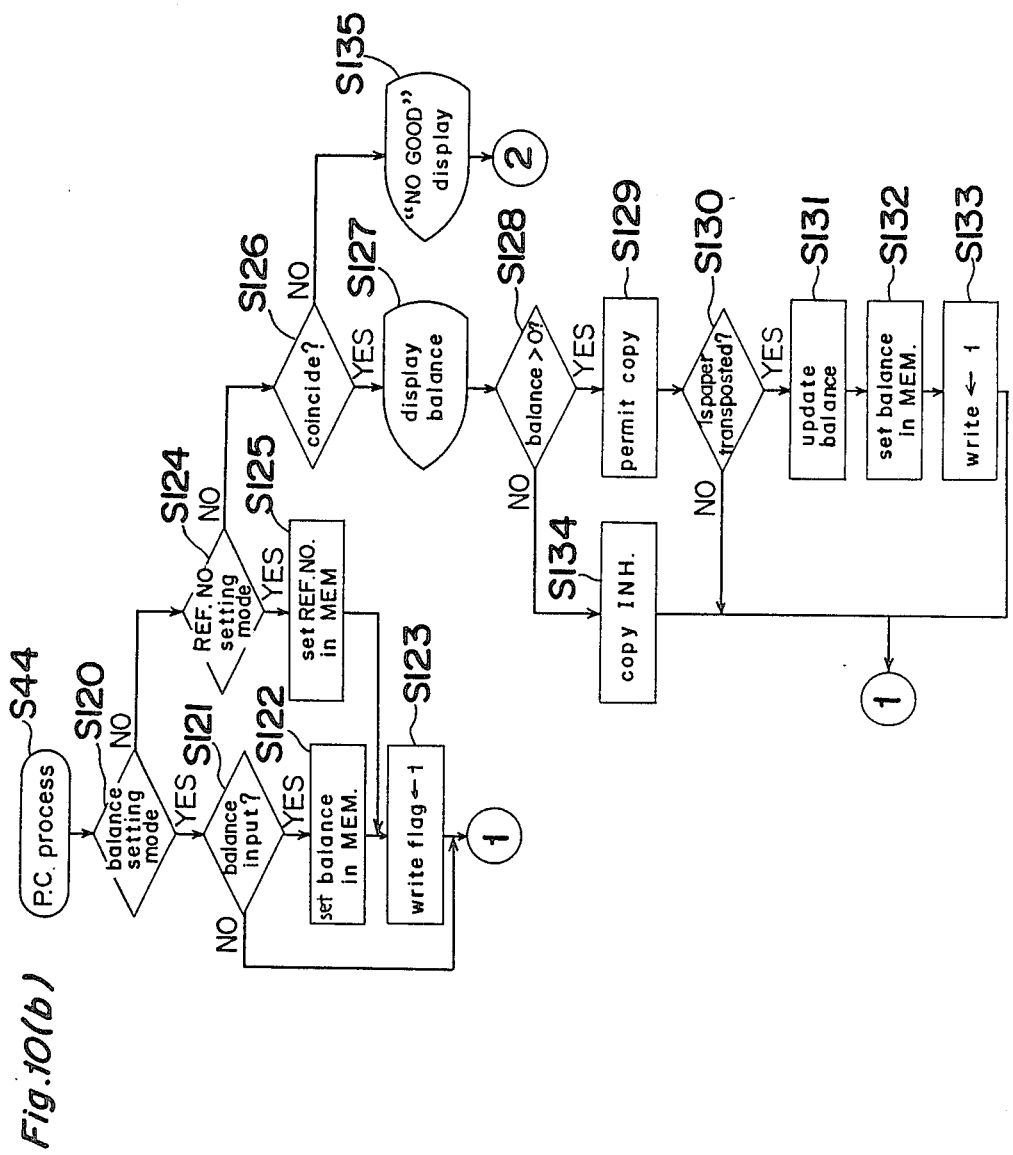
Figure 11:
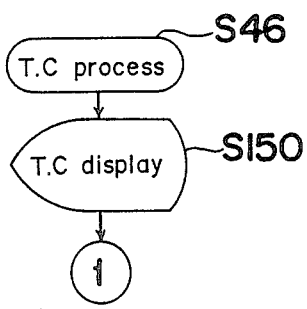

In the step S 120 shown in FIG. 10(b), it is determined whether the balance setting mode is set. The term balance means the data of the amount of money remaining in the card for the rental use of the copying machine. A personal card is not available to make copies permanently but is assigned a predetermined limit of the available rental fee or the available number of copies registered in the magnetic card 31. Namely in the personal card, if the rental fee or the number of copies already used reaches said available rental fee or number of copy, the card can not be used. Such upper limit of the available rental fee or the available number of copies is registered in the magnetic card 31 in terms of the balance. Judgement of whether the balance setting mode can be made in a manner similar to the manner as used in judging the department number setting mode. In case of the balance setting mode, it is determined in the step S 121 whether the balance is set by the operation of the operation key 103 of the copying machine 100. In case the input of the balance is present, the balance is stored in the memory area of the RAM in the step S 122, setting the write in flag to 1 in the step S 123 and the step returns to S 30. In case it is determined in the step S 120 that the mode is not the balance setting mode, namely the balance is already registered in the magnetic card 31, it is determined in the step S 124 whether or not the mode is the reference number setting mode. In case the mode is the reference number setting mode, the reference number is transferred to the memory area, setting the write in flag to 1, and the step returns to S 30. In case the mode is not the reference number setting mode, the reference number of the magnetic card 31 is compared with the reference number stored in the memory area, and if both reference numbers do not coincide, the display unit 302 displays "NO GOOD" in the step S 135 and the step returns to S 21. If both reference numbers do coincide together, the balance read from the magnetic card 31 is displayed in the step S 127. When the balance is 0, the copy is inhibited in the step S 134 and the step returns to S 30. In case the balance is greater than 0, the copy is allowed in the step S 129 and it is judged in the step S 130 whether or not the copy paper is transported.

In case the copy paper is not transported, the step returns to S 30 directly. In case the copy paper is transported, the balance is updated in the step S 131 and the balance thus updated is transferred to the memory area and the write in flag is made 1 then the step returns to S 30.

In case the magnetic card 31 inserted in the control device is determined as the totalling card, the copy number of the department and the copy number of the paper size stored in the memory for every department and paper size is displayed on the display unit 302 in the step S 150, then the step returns to S 30.

Figure 12:
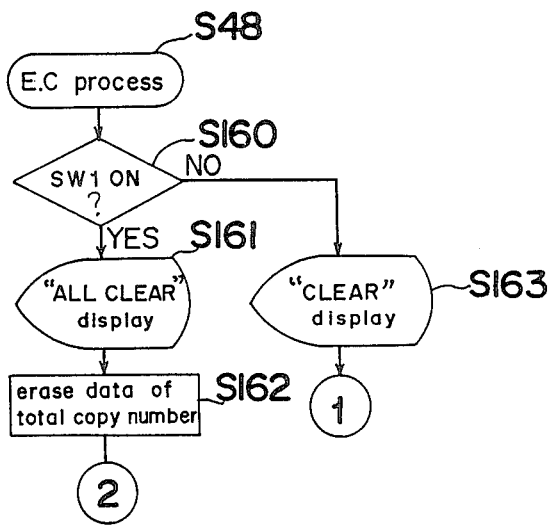

As shown in FIG. 12, in case it is determined in the step S 43 that the magnetic card 31 inserted in the control device 101 is an erasing card, it is determined in the step S 160 whether the operation key SW1 is operated. With On of the switch SW1, "ALL CLEAR" is displayed in the step S 161 and the various data stored in the memory are deleted in the step S 162 and the step returns to S 21.

Without operation of the switch SW1, "CLEAR" is displayed in the step S 163 and the step returns to S 30.

Figure 13:
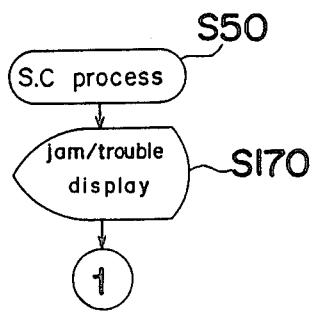
Figure 14:
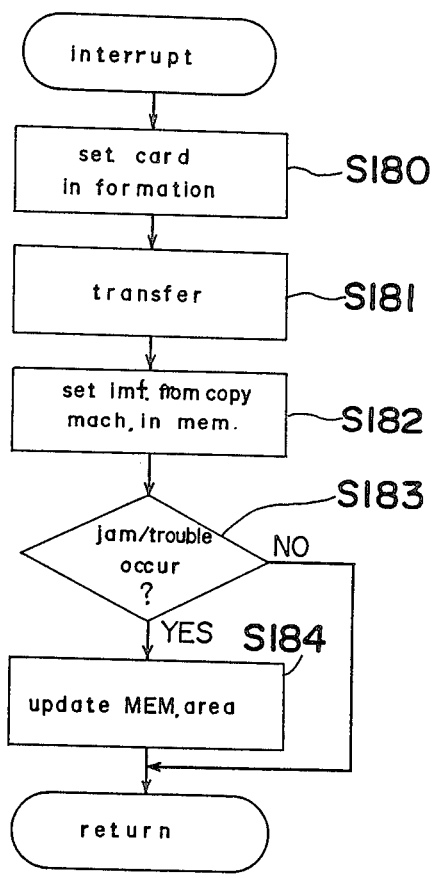

As shown in FIG. 13, in case it is determined in the step S 50 that the magnetic card 31 inserted in the control device 101 is the serviceman card, various troubles such as paper jam in the copying machine or the like stored in the memory as the history of the trouble of the copying machine is displayed, and the step returns to S 30.

In case an interruption is enabled, the information to be transmitted is set in a serial transmission register (not shown) in the step S 130 and the transmission and reception of the serial data are performed in the step S 131 synchronized with the clock pulses fed from CPU 609. When the transmission and reception are completed, the information transmitted from the copying machine is stored in RAM 606 in the step S 132. In case the jam/trouble information is contained in the transmitted information, the content of the memory corresponding to the jam/trouble information is updated in the step S 184 and the interruption is finished. If no jam/trouble occurs, the interruption is completed directly.

In the embodiment described above, the control device and copying machine are separately provided, however, in the present invention the control device may be formed integrally in the copying machine as mentioned hereinafter with reference to FIGS. 16(A) and 16(B). The control device 101 is disposed in the copying machine 100 and connected adjacent to the operation panel 102 with the operation switches SW1 and SW2 disposed on the top panel 101a of the control device 101. The display unit 104 of the copying machine 100 serves as the display unit of the control device 101. The inside construction of the control device 101 is the same as the control device mentioned above.

Figure 16:
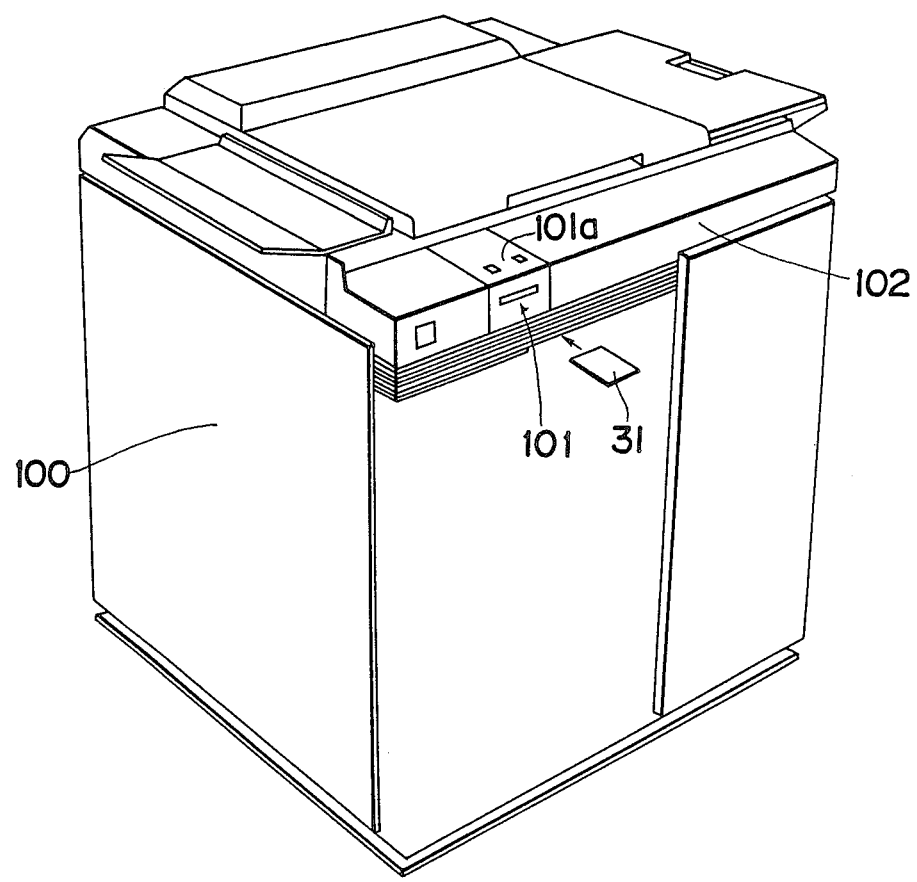
FIG. 16A is a perspective view showing another example of a copying machine.
FIG. 16B is a top plane view of an operation panel of the copying machine shown in FIG. 16A control.
Figure 16B:
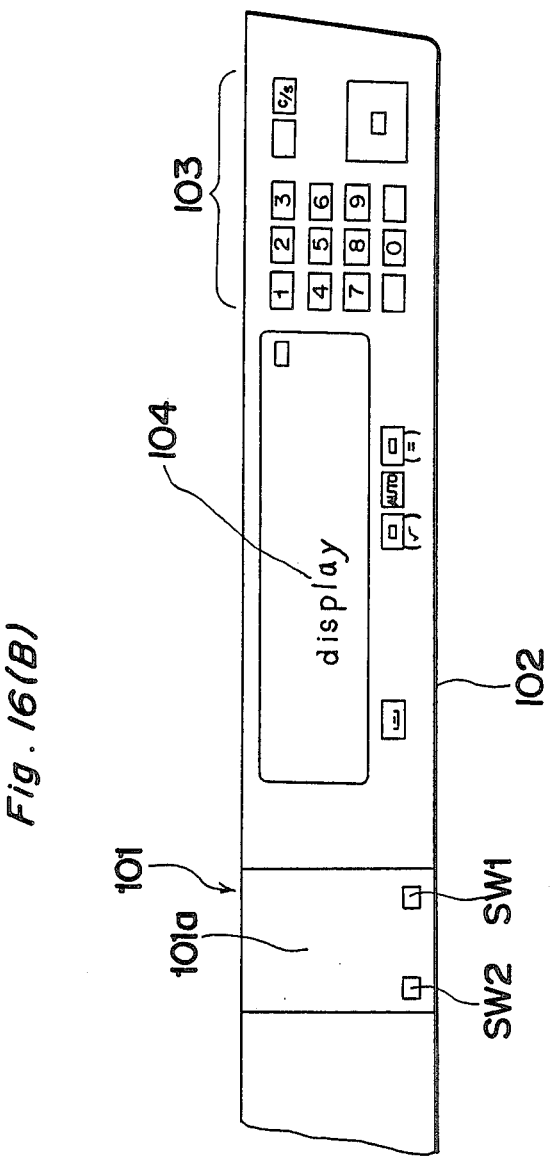

In the embodiment shown in FIG. 16(A), the different point from the previous embodiment is in that CPU 600 for controlling the control device 101 transmits the necessary information of the display to CPU of the copying machine in place of the embodiment shown in FIG. 6 in which CPU 600 controls the display unit 602 directly.

Figure 17A:
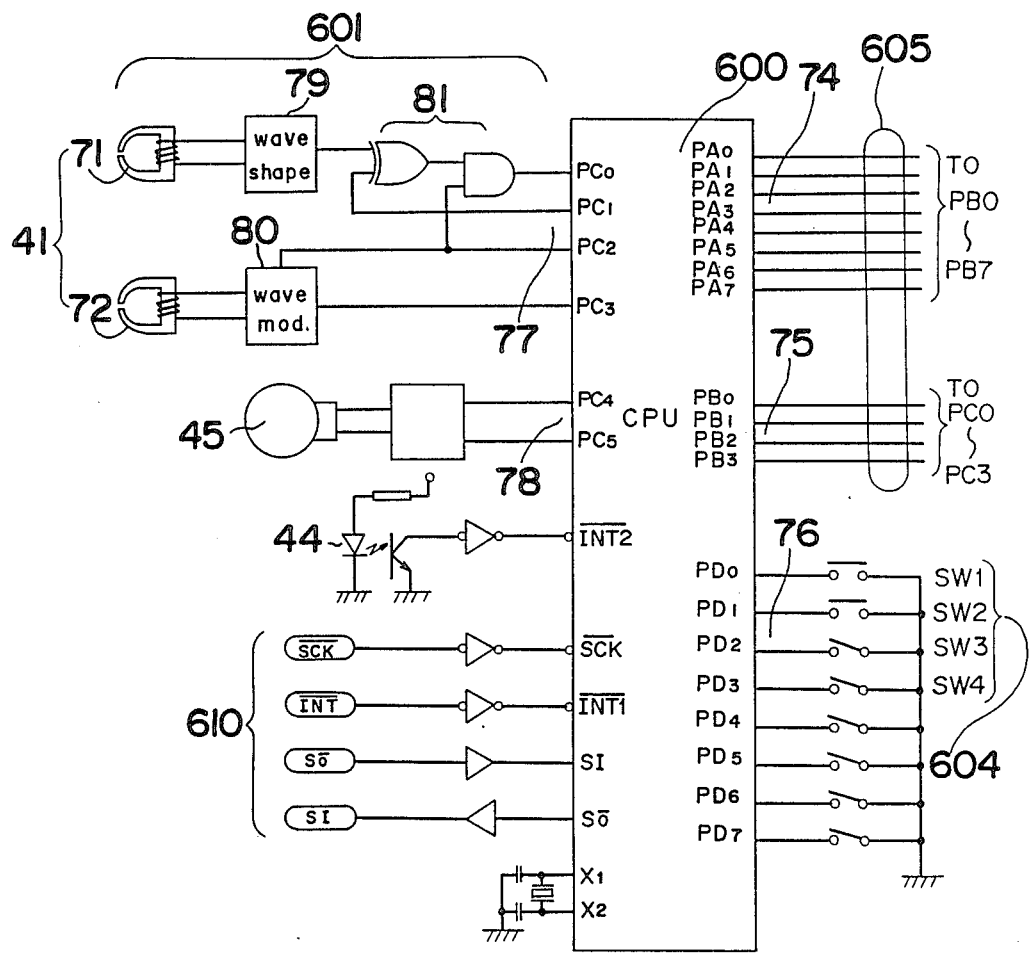
FIGS. 17a and 17b are block diagrams of another example of the control device according to the present invention.
Figure 17B:
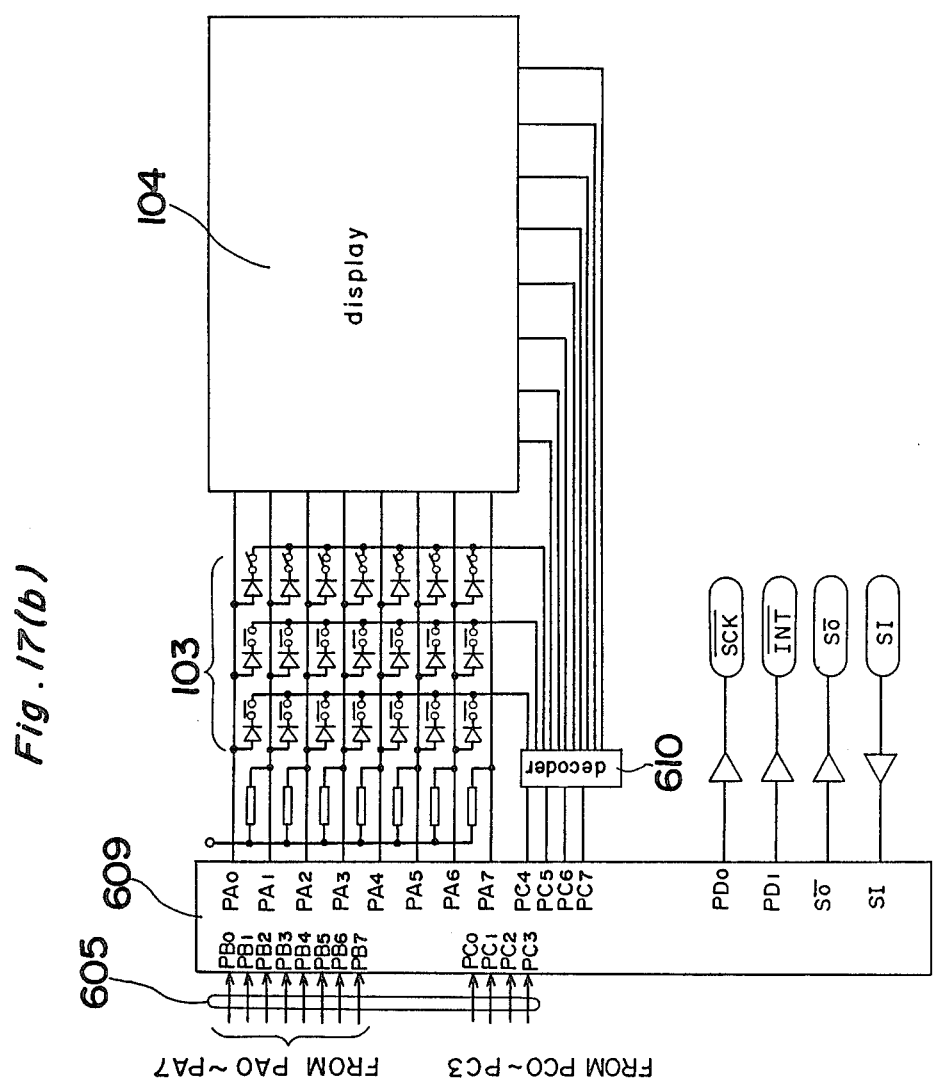
Figure 18:
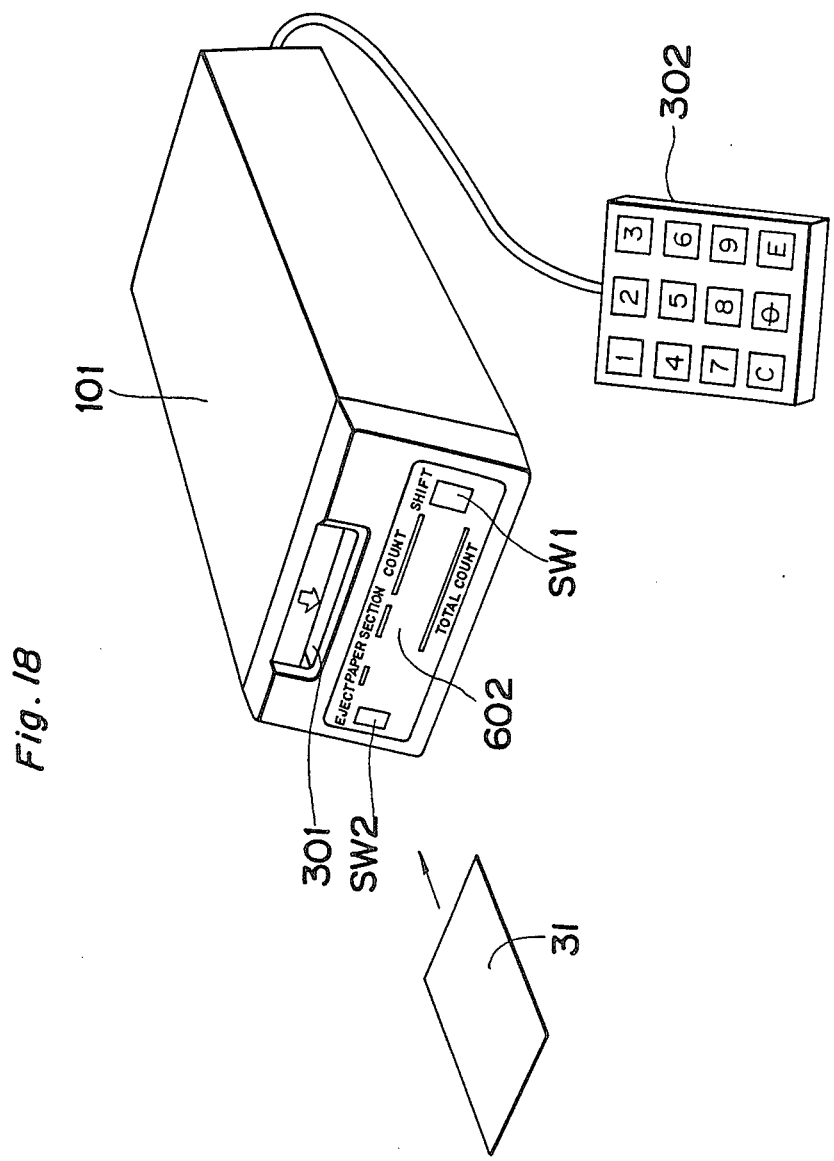
FIG. 18 is a perspective view of another embodiment of the control device according to the present invention.

Referring to FIG. 17, reference numeral 609 is a CPU for controlling the copying machine. The output ports 74 and 75 of CPU 600 of the control device 101 are coupled with CPU 609 of the copying machine 100 through the data bus lines 605 and CPU 609 serves to control the display unit 104 through a decoder 610.

Figure 19:
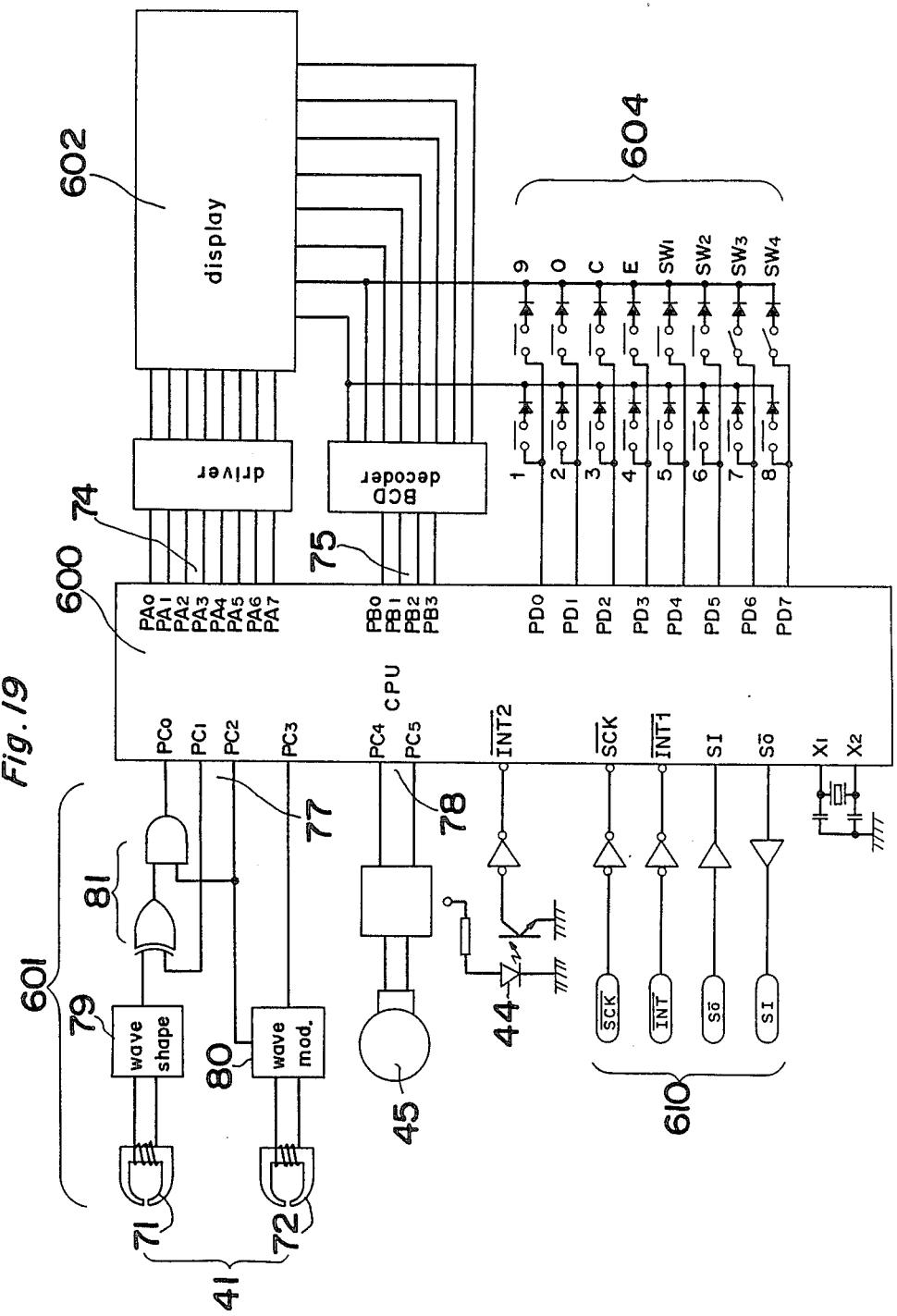
FIG. 19 is a block diagram showing further example of the control device according to the present invention.

In the embodiment mentioned above, the key unit of the copying machine 100 serves as the key unit of the control device 101, however, the key units are provided independently for the copying machine and the control machine. As shown in FIG. 19, CPU 600 of the control device 101 is connected with a key matrix 604 consisting of a plurality of key switches. In this arrangement, a step for a key input process is provided prior to the step S 41 shown in the flow chart of FIG. 9(b).

In place of using the magnetic card 31, various types of identification cards such as an optical card having optical marks written in, or an IC card in which CPU, program memory and data memory are assembled may be used.

An example of using the IC card is hereinafter described.

Figure 20:
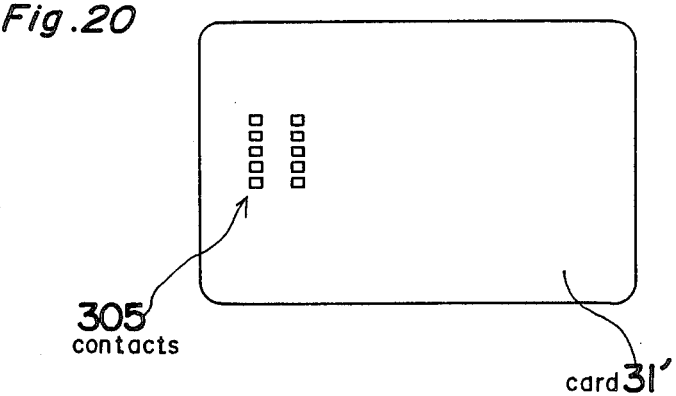
FIG. 20 is a top plan view of another example of the department card used in the control device according to the present invention.
Figure 21:
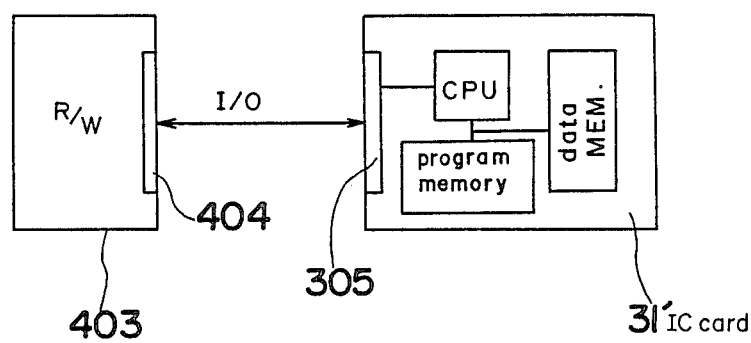
FIG. 21 is a schematic diagram showing the relation between a card reader and the department card.
Figure 22:
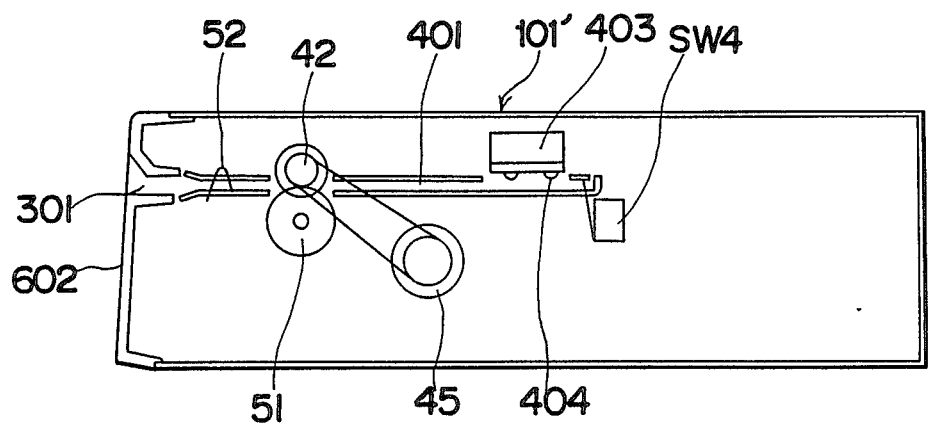
FIG. 22 is a side view showing the inside of the control device shown in FIG. 18.

The IC card 31' is composed of a thin plate, CPU, a program memory and a data memory and so on disposed on the thin plate as shown in FIG. 21, with the outer surfaces covered by a thin film to provide a card as shown in FIG. 20. On one surface of the card 31' a plurality of contacts 305 are exposed and the contacts 305 are connected with the corresponding contacts 404 of a read and write unit 403 in the control device 101' for reading the content of the card 31' or writing the data in the card 31'. The control device 101' is not required to provide a synchronizing device for writing and reading the data on the card syncronizing with the transportation of the card.

Inside of the control device 101' is shown in FIG. 21, wherein upon insertion of the card 31', the motor is rotated to transport the card inside of the control device until the card 31' enters the position where the card 31' depresses the switch SW4. At this position the card 31' contacts with the contact 404 of the reading and writing unit 403.

Figure 23:
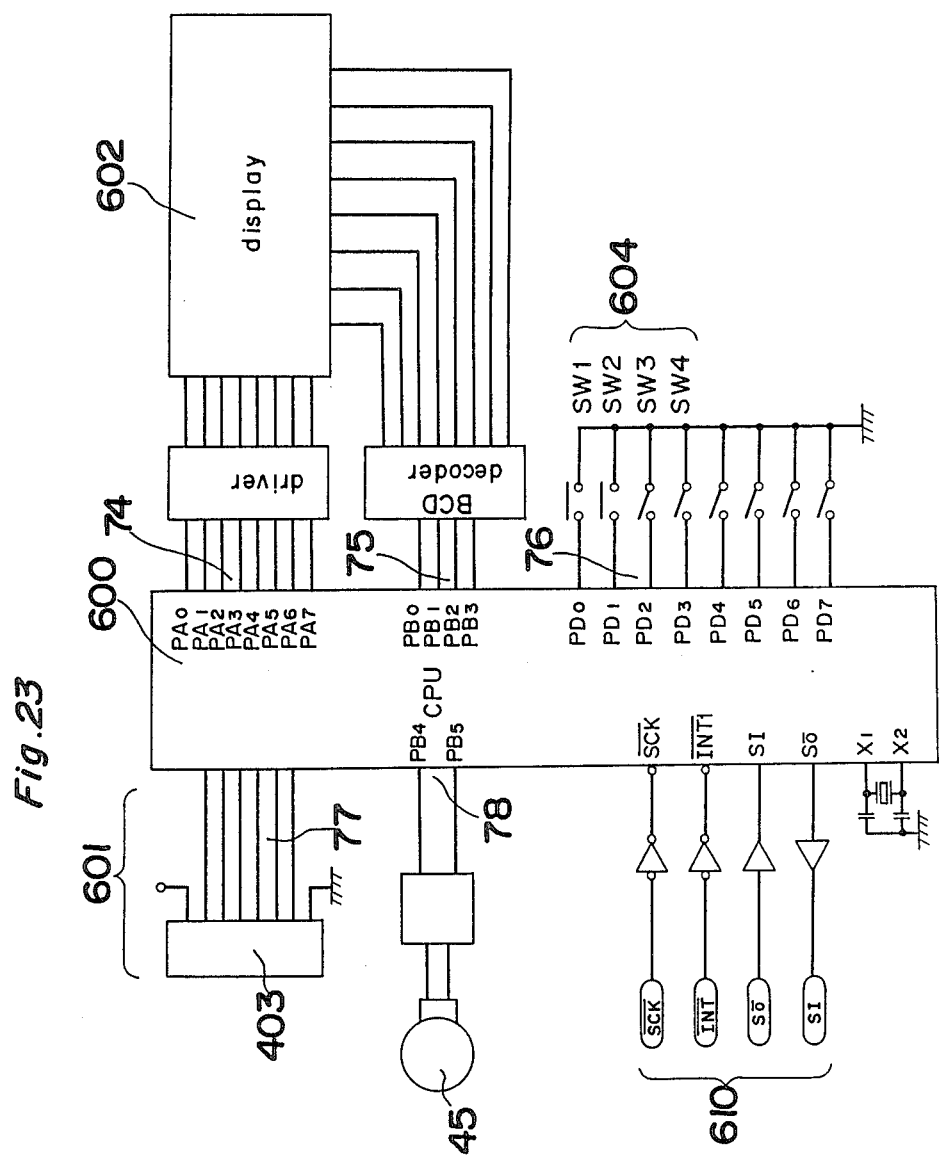
FIG. 23 is a block diagram of a further example of the control device according to the present invention.

The circuit arrangement of the control device 101' is shown in FIG. 23. The parts different from the arrangement shown in FIG. 7 are in that the circuit 44 for generation of the synchronizing pulses is omitted and the reading and writing unit 403 for IC card is coupled with the control device through the data input and output lines 77.

Figure 24A:
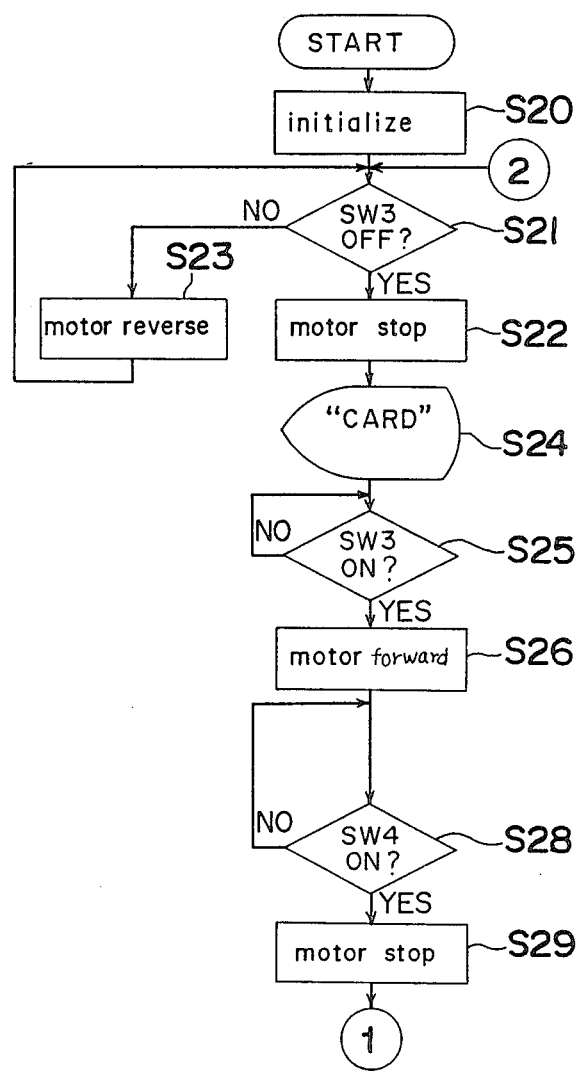
FIGS. 24a and 24b are flow charts showing another example of the control device according to the present invention.
Figure 24B:
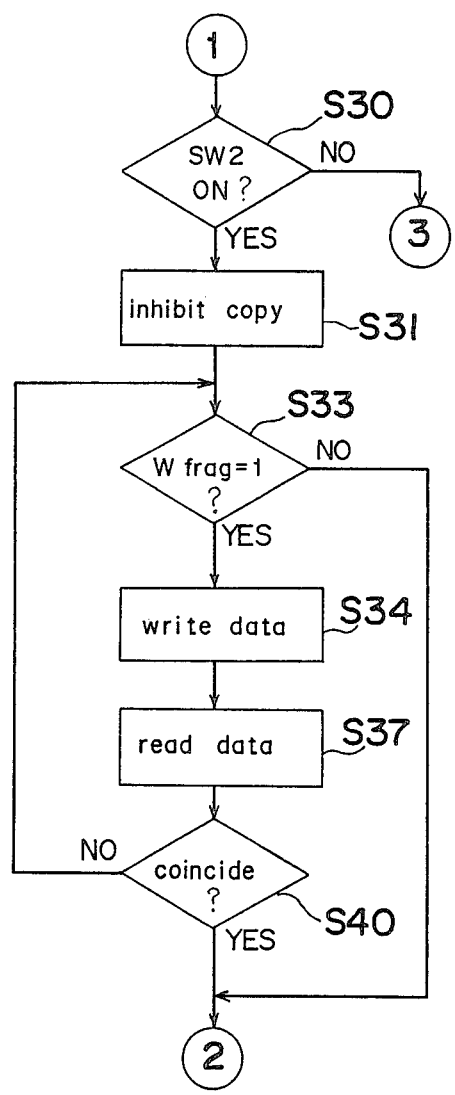

The processes performed in CPU 600 of the control device 101' are different from those performed in case of the magnetic card 31 as shown in FIG. 24, wherein the process of transporting the card to the inside of the control device is omitted from the processes shown in FIG. 19(a). Prior to the step S 40, the process of inputting and output in the data of the card 31' is performed when the program flow goes to the process shown in FIG. 9(b).

TABLE 1

| CPU 600 | direction | CPU 609 |
|---------|-----------|---------|
| So | → | Si |
| Si | ← | So |
| s̄c̄k̄ | ← | s̄c̄k̄ |
| INT | ← | output port |

TABLE 2

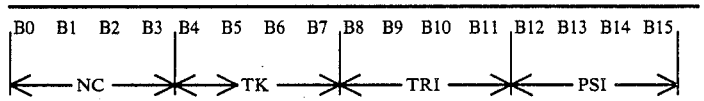

NC: number of copy, TK: ten keys, TRI: trouble information and PSI: paper size information

TABLE 3 (1)

paper size information

| B12 | B13 | B14 | B15 | paper size |
|-----|-----|-----|-----|------------|
| 0 | 0 | 0 | 1 | A6 |
| 0 | 0 | 1 | 0 | B6 |
| 0 | 0 | 1 | 1 | A5 |
| 0 | 1 | 0 | 0 | B5 |
| 0 | 1 | 0 | 1 | A4 |
| 0 | 1 | 1 | 0 | A4 |
| 0 | 1 | 1 | 1 | A3 |

TABLE 3 (2)

trouble information

| B8 | B9 | B10 | B11 | fault |
|----|----|-----|-----|-------|
| 0 | 0 | 0 | 1 | paper jam |
| 0 | 0 | 1 | 0 | separate jam |
| 0 | 0 | 1 | 1 | discharge jam |
| 0 | 1 | 0 | 0 | fault of scanning |
| 0 | 1 | 0 | 1 | fault of eraser |
| 0 | 1 | 1 | 0 | fault of lamp |
| 0 | 1 | 1 | 1 | fault of charger |
| 1 | 0 | 0 | 0 | fault of heater |
| 1 | 0 | 0 | 1 | fault of lens |

TABLE 3 (4)

copy number increment information

| B0 | B1 | B2 | B3 | |
|----|----|----|----|----|
| 0 | 0 | 0 | 1 | increment timing |
| 0 | 0 | 1 | 0 | paper feed timing |
| 0 | 0 | 1 | 1 | paper discharge timing |

TABLE 3 (3)

ten key information

| B4 | B5 | B6 | B7 | key information |
|----|----|----|----|-----------------|
| 0 | 0 | 0 | 1 | key 1 is depressed |
| 0 | 0 | 1 | 0 | key 2 is depressed |
| 0 | 0 | 1 | 1 | key 3 is depressed |
| 0 | 1 | 0 | 0 | key 4 is depressed |
| 0 | 1 | 0 | 1 | key 5 is depressed |
| 0 | 1 | 1 | 0 | key 6 is depressed |
| 0 | 1 | 1 | 1 | key 7 is depressed |
| 1 | 0 | 0 | 0 | key 8 is depressed |
| 1 | 0 | 0 | 1 | key 9 is depressed |
| 1 | 0 | 1 | 0 | key 0 is depressed |
| 1 | 0 | 0 | 1 | clear key is depressed |
| 1 | 1 | 0 | 0 | print key is depressed |

TABLE 3 (3)-continued ten key information

| B4 | B5 | B6 | B7 | key information |
|----|----|----|----|-----------------|
| 1 | 1 | 1 | 1 | no key is depressed |

TABLE 4

| B0 | B1 | B2 | B3 | B4 B5 B6 B7 B8 B9 B10 B11 B12 B13 B14 B15 |
|----|----|----|----|----|
| data of kind of the card | | | | |

TABLE 5 data of kind of the card

| B0 | B1 | B2 | B3 | kind of the card |
|----|----|----|----|------------------|
| 0 | 0 | 0 | 1 | department/personal card |
| 0 | 0 | 1 | 0 | totalling/erasing card |
| 0 | 0 | 1 | 1 | serviceman card |
| 0 | 1 | 0 | 0 | trouble input card |

TABLE 6

| B4 | 0 | copy available |
|----|---|----------------|
| | 1 | copy is inhibited |
| B5 | 0 | card is present |
| | 1 | card is absent |

What is claimed is:

1. A control device for use in controlling various information relating to a recording apparatus which can be operated in response to instructions fed from the control device, said control device being provided with a memory device for storing information relating to the operation of the apparatus and being operable by removably attaching a memory medium to the control device, said memory medium having a memory area for storing coded information in relation to the user of the recording apparatus, said control device comprising:
   key input means being operable by the user for inputting a specific coded signal;
   means for writing the specific coded signal into the memory area of said memory medium; and
   means for enabling the recording apparatus in response to the specific coded signal which is read out from the memory area of the memory medium attached to the control device.

2. The control device according to claim 1 wherein said memory medium is a magnetic card.

3. The control device according to claim 1 wherein said memory medium is an IC card.

4. The control device according to claim 1 wherein said recording apparatus is a copying machine having ten keys for inputting a number of sheets to be copied, and said key input means includes the ten keys.

5. A control device for use in controlling various information relating to a recording apparatus which can be operated in response to instructions fed from the control device, said control device being provided with a memory device for storing information relating or the operation of the recording apparatus and being operable by removably attaching a memory medium to the body of the control device, said memory medium having a memory area for storing coded information in relation to the user of the recording apparatus, said control device comprising:

means for comparing a first reference number registered in the memory medium with a second reference number registered in the memory device of the control device;

means for inhibiting operation of the recording apparatus when the value of the first reference number does not coincide with the value of the second reference number;

means for detecting the presence and absence of the first reference number in the memory medium, and means for writing a predetermined reference number in the memory medium in the case of the absence of the first reference number in the memory medium.

6. The control device according to claim 5 wherein said memory medium is a magnetic card.

7. The control device according to claim 5 wherein said memory medium is an IC card.

8. In a control device for use in controlling various information relating to a recording apparatus which can be operated in response to the instructions fed from the control device, said control device being provided with a memory device for storing information relating to the operation of the recording apparatus and being operable by removably attaching a memory medium to the body of the control device, said memory medium having a memory area for storing coded information in relation to the use of the recording apparatus, the improvement to the control device comprising:

means for inputting a value relating to the use of the recording apparatus and, means for writing the input value in the memory medium.

9. The control device according to claim 8 wherein said apparatus is a copying machine and the value relating to the use of the apparatus is an upper limit of the available number of copies that can be made.

10. An improved copying machine for reproducing copies of an original document, comprising:

means for copying an original document to produce copies;

means for implementing a copying cycle by the copying means including control panel input members for use by a user;

means for determining the number of copies made from the original document;

a memory medium having a memory area for storing data;

a control device connected to the implementing means and the determining means for removably receiving the memory medium containing predetermined data such as the identification of the memory medium, the control device having a read write assembly for both reading data from the memory medium's memory area and writing data relative to the operation of the copying machine into the memory medium's memory area; and means for entering information into the control device including directing the read write assembly to write data into the memory medium's memory portion through the control panel input members.

11. An improved copying machine for reproducing copies of an original document, comprising:

means for copying an original document to produce copies;

means for implementing a copying cycle by the copying means including control panel input members for use by a user;

means for determining the number of copies made from the original document;

a removable card member having a memory medium with a memory area for storing data including a designated memory area for storing a predetermined reference verification data;

a control device connected to the implementing means and the determining means for removably receiving the card member containing the predetermined data, the control device having a read write assembly for both reading data from the memory medium's memory area and writing data relative to the operation of the copying machine into the card member's memory area;

means for transporting the card member in one direction for reading data on the card member and in a reverse direction for writing data into the memory area of the card member including the designated memory area for storing the reference verification data, and means for entering information into the control device including directing the read write assembly to write data into the card member's memory portion including the designated memory area for storing a predetermined reference verification data through the control panel input members.

12. An improved copying machine for reproducing copies of an original document, comprising:

means for copying an original document to produce copies;

means for implementing a copying cycle by the copying means including a control panel display and input members for inputting data by a user;

means for determining the number of copies made from the original document including a memory for storing data on the copies made;

a plurality of removable card members having memory areas including a card member having a preset number of permissible copies that can be used to produce copies, a service card member that can implement a service routine of the copying machine by displaying on the control panel the service history of the copying machine, and a totalling card member to display the copy numbers and paper sizes for each user of the machine;

a control device connected to the implementing means and the determining means for removably receiving the card members, each card member containing predetermined data such as the identification of the card member, the control device having a read write assembly for both reading data from the card member's memory area and writing data relative to the operation of the copying machine into at least one of the card member's memory areas, and means for entering information into the control device including directing the read write assembly to write data into the card member's memory portion through the control panel input members.

* * * * *